United States Patent
Junk

(10) Patent No.: US 12,265,384 B2
(45) Date of Patent: Apr. 1, 2025

(54) METHODS AND SYSTEM FOR MINOR LOOP FEEDBACK FALLBACK

(71) Applicant: Fisher Controls International LLC, Marshalltown, IA (US)

(72) Inventor: Kenneth Junk, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 848 days.

(21) Appl. No.: 14/880,806

(22) Filed: Oct. 12, 2015

(65) Prior Publication Data

US 2016/0033942 A1    Feb. 4, 2016

Related U.S. Application Data

(63) Continuation of application No. 13/922,046, filed on Jun. 19, 2013, now Pat. No. 9,411,321.

(60) Provisional application No. 61/661,930, filed on Jun. 20, 2012.

(51) Int. Cl.
   G05B 9/03    (2006.01)

(52) U.S. Cl.
   CPC ..................................... *G05B 9/03* (2013.01)

(58) Field of Classification Search
   CPC ....................................................... G05B 9/03
   See application file for complete search history.

(56) References Cited

U.S. PATENT DOCUMENTS

| | | |
|---|---|---|
| 5,558,115 A | 9/1996 | Lenz et al. |
| 6,128,541 A | 10/2000 | Junk |
| 6,272,401 B1 | 8/2001 | Boger et al. |
| 7,222,016 B2 | 5/2007 | Snowbarger et al. |
| 8,190,305 B1 | 5/2012 | Prince et al. |
| 9,411,321 B2 | 8/2016 | Junk |
| 2001/0032518 A1 | 10/2001 | Boger et al. |
| 2004/0236472 A1* | 11/2004 | Junk ................... F15B 13/0402 700/282 |
| 2005/0278074 A1 | 12/2005 | Junk et al. |
| 2006/0031001 A1* | 2/2006 | Snowbarger ............. G05B 5/00 701/101 |

(Continued)

FOREIGN PATENT DOCUMENTS

| | | |
|---|---|---|
| CN | 1453454 | 11/2003 |
| CN | 1453455 | 11/2003 |
| CN | 1459551 | 12/2003 |

(Continued)

OTHER PUBLICATIONS

United States Patent and Trademark Office, "Notice of Allowance," issued in connection with U.S. Appl. No. 13/922,046, mailed on Apr. 22, 2016, 16 pages.

(Continued)

*Primary Examiner* — Emilio J Saavedra
(74) *Attorney, Agent, or Firm* — Hanley, Flight & Zimmerman, LLC

(57) ABSTRACT

Methods and system for minor loop feedback fallback are disclosed. An example method includes controlling a process control device using first values from a first sensor; comparing the first values to reference values to identify a difference; and in response to the difference being outside of a threshold, controlling the process control device using second values from a second sensor.

26 Claims, 6 Drawing Sheets

(56) References Cited

U.S. PATENT DOCUMENTS

| | | | | |
|---|---|---|---|---|
| 2007/0276545 | A1* | 11/2007 | Smirnov | G05B 13/024 700/282 |
| 2013/0345834 | A1 | 12/2013 | Junk | |

FOREIGN PATENT DOCUMENTS

| | | |
|---|---|---|
| CN | 1969127 | 5/2007 |
| CN | 1993660 | 7/2007 |
| CN | 201830012 | 5/2011 |
| CN | 203587991 | 5/2014 |
| JP | 07-083203 | 3/1995 |
| JP | H08232726 A | 9/1996 |
| JP | H09502292 A | 3/1997 |
| JP | 2008-251048 | 10/2008 |
| WO | 95/06276 | 3/1995 |

OTHER PUBLICATIONS

United States Patent and Trademark Office, "Notice of Allowance," issued in connection with U.S. Appl. No. 13/922,046, mailed on Jan. 8, 2016, 15 pages.

United States Patent and Trademark Office, "Non-Final Office Action," issued in connection with U.S. Appl. No. 13/922,046, mailed on Sep. 21, 2015, 24 pages.

Japanese Patent Office, "Notice of Reasons for Rejection," issued in connection with Japanese Patent Application No. 2015-518578, on Feb. 7, 2017, 6 pages.

Patent Cooperation Treaty, "International Preliminary Report on Patentability", issued in connection with PCT Patent Application No. PCT/US2013/046803, issued on Dec. 23, 2014, 5 pages.

Patent Cooperation Treaty, "International Search Report", issued in connection with PCT Patent Application No. PCT/US2013/046803, mailed on Sep. 27, 2013, 3 pages.

Patent Cooperation Treaty, "Written Opinion", issued in connection with PCT Patent Application No. PCT/US2013/046803, mailed on Sep. 27, 2013, 4 pages.

State Intellectual Property Office of the People's Republic of China, "Notification of the First Office Action," issued in connection with Chinese Patent Application No. 201310269915.8, issued on Aug. 31, 2016, 28 pages.

Ningsheng, "The Redundancy Designs for Guidance and Control System of Launch Vehicle", Beijing Aerospace Control, 2003, vol. 2, pp. 68-80, English Abstract Included, 13 pages.

Meixin, "The Application of PC-1 Type Microcomputer-based Governor in Gutian Stream Power Plant," Fujian Power and Electrical Engineering, vol. 14, No. 4, Dec. 31, 1994, 3 pages.

European Patent Office, "Communication under Rule 71(3) EPC," issued in connection with European Patent Application No. 13734584.9, dated May 28, 2018, 23 pages.

Federal Service for Intellectual Property, "Inquiry Under the Substantive Examination," issued in connection with Russian Patent Application No. 2014152793, dated Dec. 13, 2016, 7 pages.

State Intellectual Property Office of the Peoples' Republic of China, "First Rectification Notification," issued in connection with Chinese Patent Application No. 201320382603.3, issued on Oct. 24, 2013, 3 pages. [English translation provided].

European Patent Office, "Communication pursuant to Article 94(3) EPC," issued in connection with European Patent Application No. 13734584.9, dated Dec. 14, 2016, 2 pages.

Federal Service for Intellectual Property, "Decision on Granting," issued in connection with Russian Patent Application No. 2014152793, dated Apr. 12, 2017, 4 pages.

State Intellectual Property Office of the Peoples' Republic of China, "Notification of the Second Office Action," issued in connection with Chinese Patent Application No. 201310269915.8, issued on May 4, 2017, 9 pages. [English translation provided].

Japanese Patent Office, "Notice of Reasons for Rejection," issued in connection with Japanese Patent Application No. 2015-518578, on Jul. 4, 2017, 6 pages. [English translation provided].

Japanese Patent Office, "Decision of Refusal," issued in connection with Japanese Patent Application No. 2015-518578, on Jan. 23, 2018, 5 pages. [English translation provided].

State Intellectual Property Office of the Peoples' Republic of China, "Notice of Granting Patent Right for Invention," issued in connection with Chinese Patent Application No. 201310269915.8, issued on Mar. 21, 2018, 4 pages. [English translation provided].

National Institute of Industrial Property National Patent Administration, "Office Action," issued in connection with Argentinean Application No. 20130102199, dated May 22, 2018, 6 pages. [English translation provided].

Japanese Patent Office, "Decision to Grant a Patent," issued in connection with Japanese Patent Application No. 2015-518578, on Jul. 31, 2018, 5 pages. [English translation provided].

Canada Patent Office, "Examiner Requisition," issued with connection with Canada Patent Application No. 2,875, 102, mailed on Jan. 3, 2019, 3 pages.

\* cited by examiner

METHODS AND SYSTEM FOR MINOR LOOP FEEDBACK FALLBACK

RELATED APPLICATION

This patent is a continuation of U.S. patent application Ser. No. 13/922,046, entitled "METHODS AND SYSTEM FOR MINOR LOOP FEEDBACK FALLBACK," which was filed on Jun. 19, 2013, which claims priority to U.S. Provisional Application Ser. No. 61/661,930, entitled "METHODS AND SYSTEM FOR MINOR LOOP FEEDBACK FALLBACK," which was filed on Jun. 20, 2012. U.S. patent application Ser. No. 13/922,046 and U.S. Provisional Application Ser. No. 61/661,930 are hereby incorporated herein in their entireties.

FIELD OF THE DISCLOSURE

This disclosure relates generally to minor loop feedback fallback, and, more particularly, to methods and system for minor loop feedback fallback.

BACKGROUND

A variety of control mechanisms may be used to control a valve/actuator assembly or other process control device. For example, valve controllers may use a feedback control to control the valve/actuator assembly. The feedback control uses an error signal based on a difference between a desired set point signal and a feedback signal.

FIGURES

DETAILED DESCRIPTION

Figure 1:
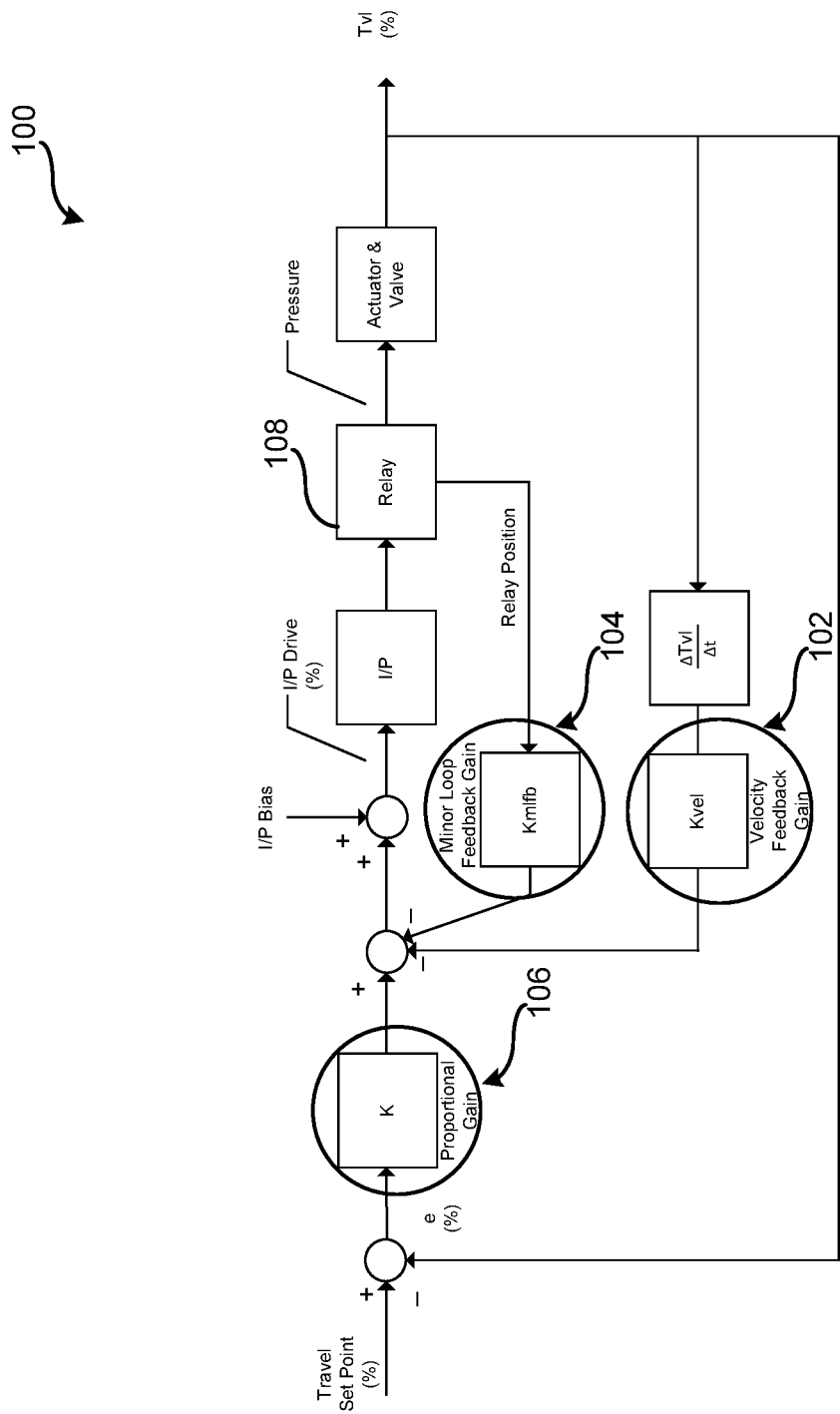
FIG. 1 depicts an example servo controller of a digital positioner that may be used to implement the examples disclosed herein.

Minor loop feedback may be used to stabilize a positioner response. In some known systems, if a minor loop feedback sensor fails, the positioner (e.g., a DVC6200 digital valve controller) will oscillate about a given set point, causing an unstable response in valve travel. In other known systems, a current source may generate a large magnetic field that is picked up by the minor loop feedback sensor, introducing a transient disturbance in the feedback compensation circuit that causes the valve to move in an uncontrolled fashion. In other examples, thermal cycling, vibration, shock or other external environmental factors causes the minor loop feedback sensor to go out of range, become invalid and/or cause the minor loop feedback sensor connection to become damaged and/or fail.

Interferences, which may disturb the control system, may be introduced by a transient disturbance caused by a two-way radio or a constant disturbance caused by nearby processes or machinery. In examples where the minor loop feedback sensor fails, the minor loop feedback signal may remain constant near its null state, the minor loop feedback signal may remain at a constant value significantly off its null state and/or significant bias may be introduced into the minor loop feedback compensation loop. In some examples, having the minor loop feedback signal remain near a null state causes a closed loop system response to oscillate around a set point. In some examples, having the minor loop feedback signal remain constant at a value significantly off a null state causes the closed loop system response to oscillate around a set point plus a bias. In some examples, having a significant bias introduced into the minor loop feedback causes the control valve to saturate at one end or the other.

In examples where the feedback signal is unreliable (e.g., a two-way radio is used near a sensor including a magnet), a transient disturbance can be introduced into the servo control causing a stem of a process control device to move in an uncontrolled manner. Some sensors that may be affected by an external magnetic field include Hall effect sensors and/or GMRs. In some examples, a minor loop feedback failure may be identified when there is a limit cycle in the travel feedback signal but the minor loop feedback signal is constant. In some examples, the minor loop feedback signal may be correlated with a dp/dt feedback signal to identity a difference and/or a failure. In some examples, when there is a change identified in the dp/dt feedback signal without a corresponding change identified in the GMR, the minor loop fallback may be used to control minor loop feedback in the positioner. In some examples, to identify external disturbances, the minor loop feedback signal can be correlated with the I/P drive signal. In examples in which the minor loop feedback signal leads the I/P drive signal, there may be an external disturbance to the minor loop feedback signal. Additionally or alternatively, one or more sensors may be used that provide a signal indicative of a minor loop feedback failure.

The examples disclosed herein provide minor loop feedback fallback control if a minor loop feedback sensor fails. In some examples, the example minor loop fallback may be implemented by digital dp/dt (the time derivative of actuator pressure (p)). In some examples, dp/dt feedback controls minor loop feedback in the positioner. In some examples, dp/dt feedback may be used to dampen a response when the positioner is controlling travel or when the positioner is controlling pressure. In some examples, the digital dp/dt feedback is as effective at damping the positioner as the GMR. In some examples, the digital dp/dt feedback is included in a pressure servo controller, but is not visible to the end user. The digital dp/dt feedback may be implemented in the pressure servo controller as a backup for applications where the GMR is unable to be calibrated for pressure (e.g., a hot cutover).

The examples disclosed herein address failures of and/or severe biases introduced into a minor loop feedback. In some examples, if the signal from the GMR is substantially and/or significantly outside of an operating range, the forward path gain may be automatically reduced (e.g., divided by three with a lower limit of two) and the dp/dt, which may be digitally implemented, may be used as a backup minor loop feedback. Additionally or alternatively, if the pressure sensor fails, a minor loop feedback gain may be set to zero and the forward path gain may be automatically reduced by, for example, a factor of three with a fixed upper limit and/or a fixed lower limit. In some examples, fixing the upper limit ensures that large forward path gains are sufficiently reduced, thereby ensuring a stable response.

Additionally and/or alternatively, in some examples, the velocity feedback may be increased to provide additional damping to the servo controller. In some such examples, the forward path gain may be reduced by a factor of 3 with a minimum value of 2.8. For example, during normal operation, forward path gain (K) may equal 12, minor loop feedback as implemented by relay position (Kmlfb) may equal 35 and velocity feedback gain (Kvel) may equal 4. In some examples, during a failure condition in which the minor loop feedback sensor fails, K may be reduced to 4, Kmlfb may be set to zero and Kvel may be increased to 15. In some examples, during a failure condition in which the pressure sensor fails, K may equal 4, Kmlfb may equal 0 and Kvel may equal 15. However, if dp/dt is used for minor loop feedback, the remainder of the system does not have to be detuned. Additionally, the examples disclosed herein may include add-ons such as failure alerts, automatic or manual recovery, adjustments of the velocity feedback gain and/or adjustments of the pressure fallback gains and/or servo mechanism.

FIG. 1 depicts a servo controller 100 of a digital positioner. The servo controller 100 is a high gain proportional controller with two damping elements. In this example, the damping elements include a velocity feedback 102 and a minor loop feedback 104. In some examples, tuning the servo controller 100 includes adjusting a forward gain path 106, the velocity feedback 102 and the minor loop feedback 104.

In the servo controller 100, the minor loop feedback 104, which is the dominant damping element, may be predicted based on a position of a relay 108. The velocity feedback 102 may also dampen the response of the controller 100, but is not as effective at damping the servo controller 100 as the minor loop feedback 104.

Figure 2:
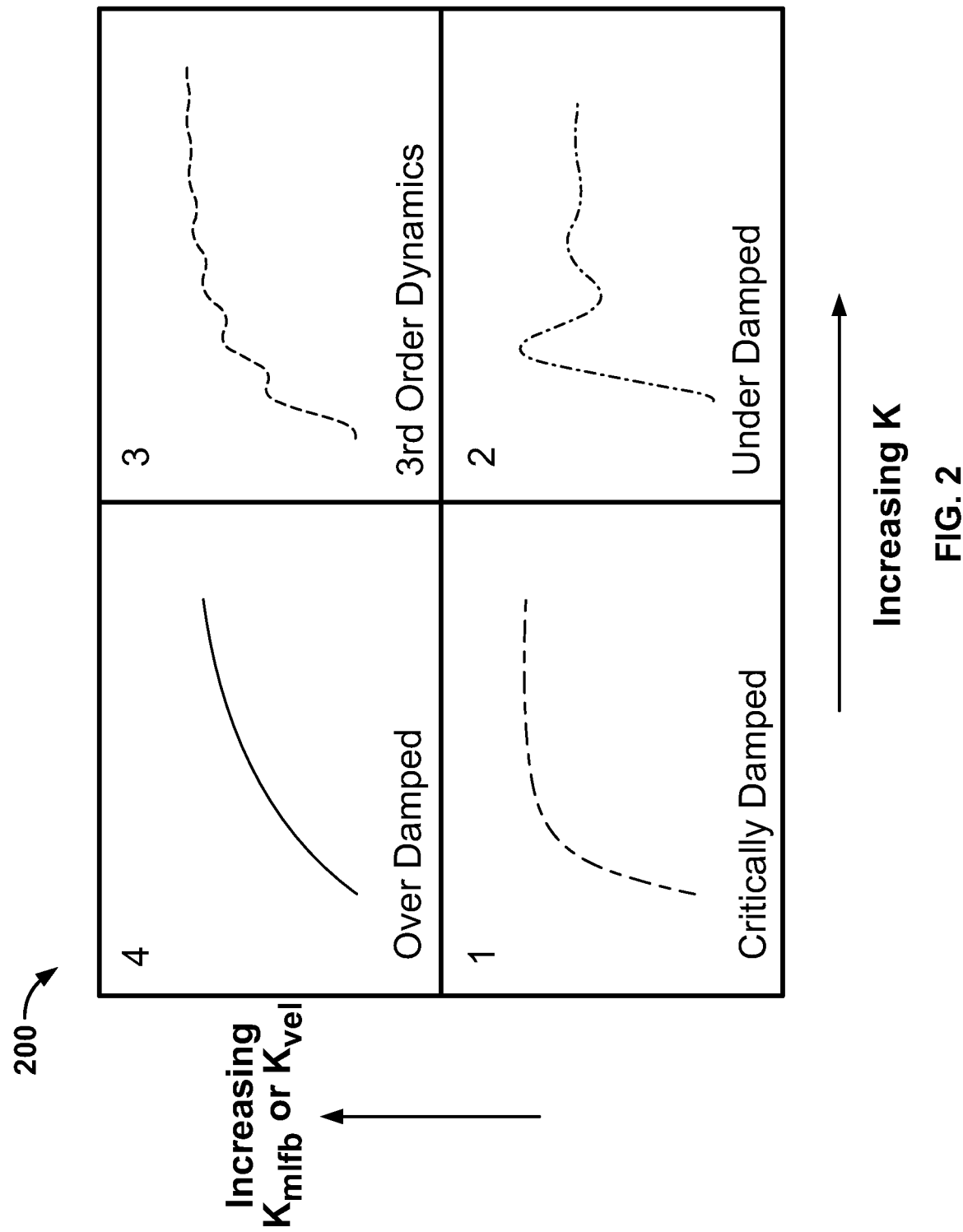
FIG. 2 depicts an example tuning map.

FIG. 2 depicts an example tuning map 200. When tuning a servo such as the servo controller 100, a forward gain path may be increased to have as high a gain as possible without destabilizing the system. In some examples, as the forward path gain is increased, the damping is increased by increasing the minor loop feedback gain. Without minor loop feedback gain and/or increasing the minor loop feedback gain, the system may become unstable.

Figure 3:
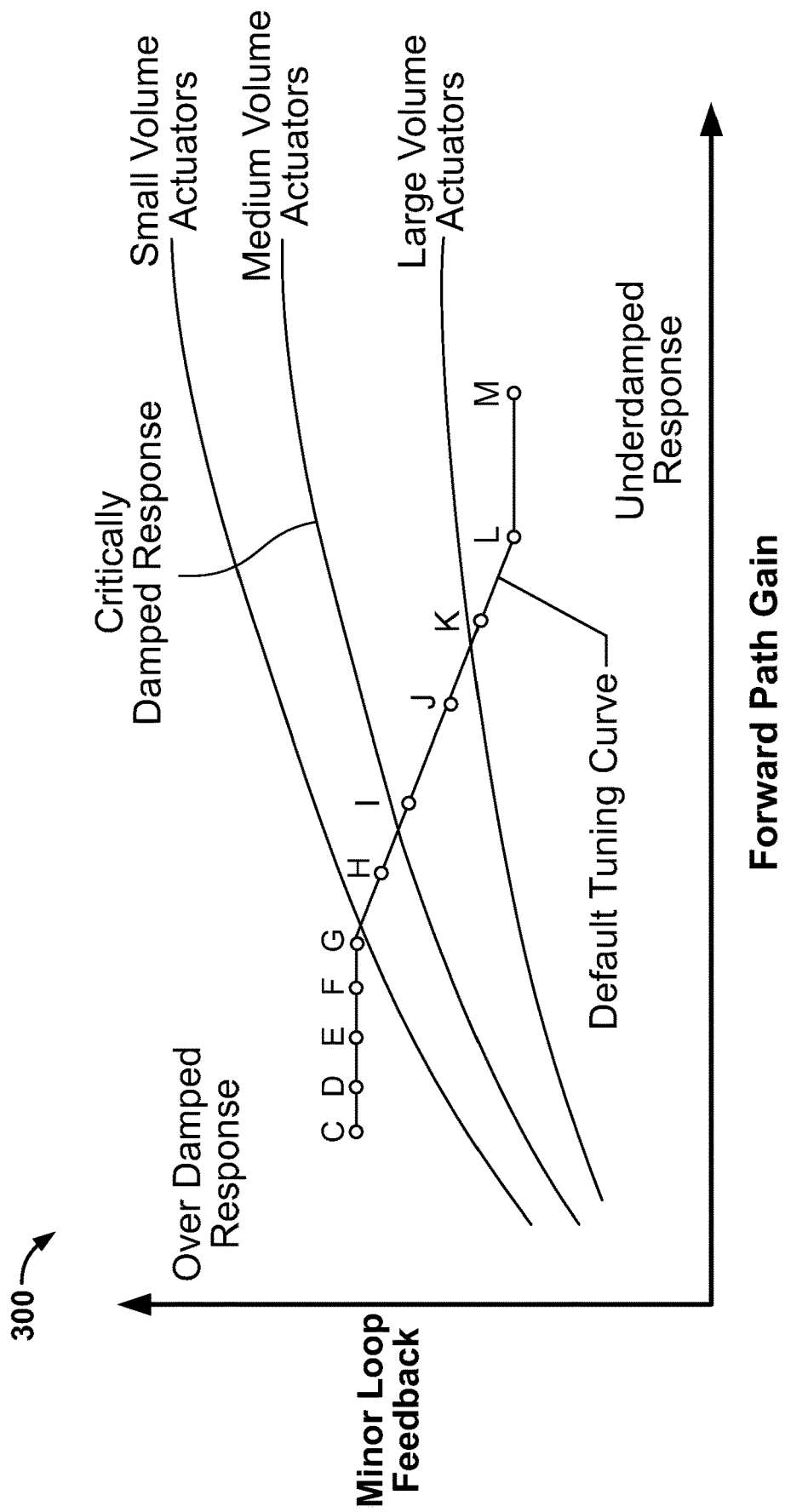
FIG. 3 depicts a graph of example processes to tune a valve.

FIG. 3 depicts a graph of example processes 300 of tuning a valve. In the processes 300, it is assumed that a minor loop feedback is active and functional. If the minor loop feedback fails (e.g., a sensor fails), the valve may become unstable and start to oscillate.

Figure 4:
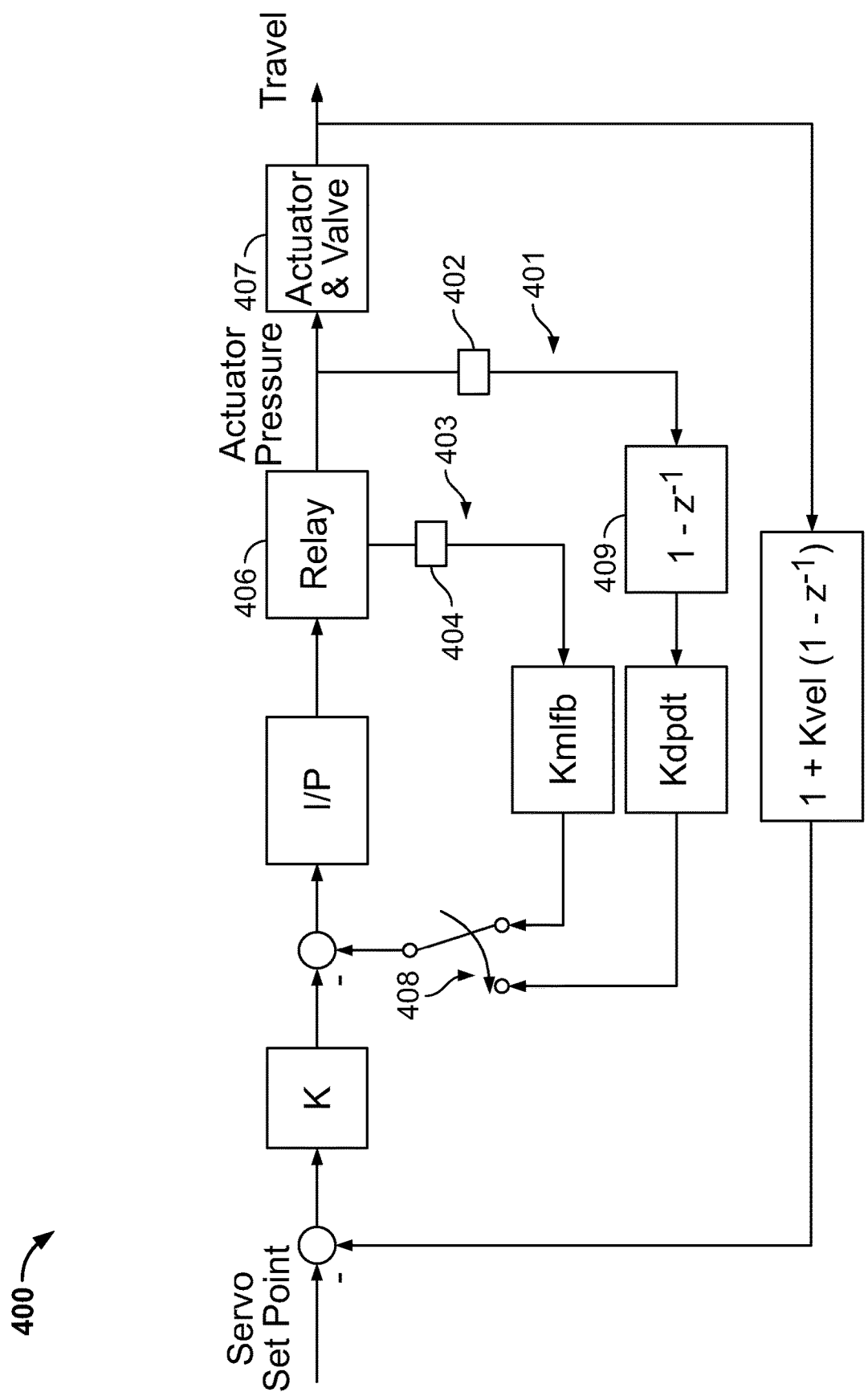
FIG. 4 depicts an example servo controller including an example pressure fallback.

FIG. 4 depicts an example servo controller 400 including a first minor loop feedback control path 401 associated with an example pressure fallback sensor and/or pressure sensor 402 and a second minor loop feedback control path 403 associated with a minor loop feedback sensor 404. In some examples, the pressure fallback sensor 402 determines a minor loop feedback gain value and/or a minor loop feedback value by taking a derivative of a pressure obtained downstream of a relay 406 and upstream of a process control device 407 (see 409). In some examples, the minor loop feedback sensor 404 determines a minor loop feedback gain value and/or a minor loop feedback value based on a position of the relay 406. As discussed above, the minor loop feedback gain value may be used to dampen the servo controller 400.

In operation, if the minor loop feedback sensor 404 fails and/or is unstable, the servo controller 400 automatically switches via a switch 408 from the minor loop feedback sensor 404 to the pressure fallback sensor 402 (e.g., switches from a first minor loop feedback control mode to a second minor loop feedback control mode). Thus, even if the first minor loop feedback control mode fails, the servo controller 400 continues to operate. In some examples, an estimate of the derivative, dp/dt, used in the second minor loop feedback control mode, can be written as $(p[k])-p[k-1])/dt$. In examples in which dt is a fixed sample rate, the dt may be included in a gain factor and a difference equation, $p[k]-p[k-1]$, may be used to determine a minor loop feedback gain value and/or a minor loop feedback value, where p is actuator pressure, k is an index, k-1 is the previous index.

Figure 5:
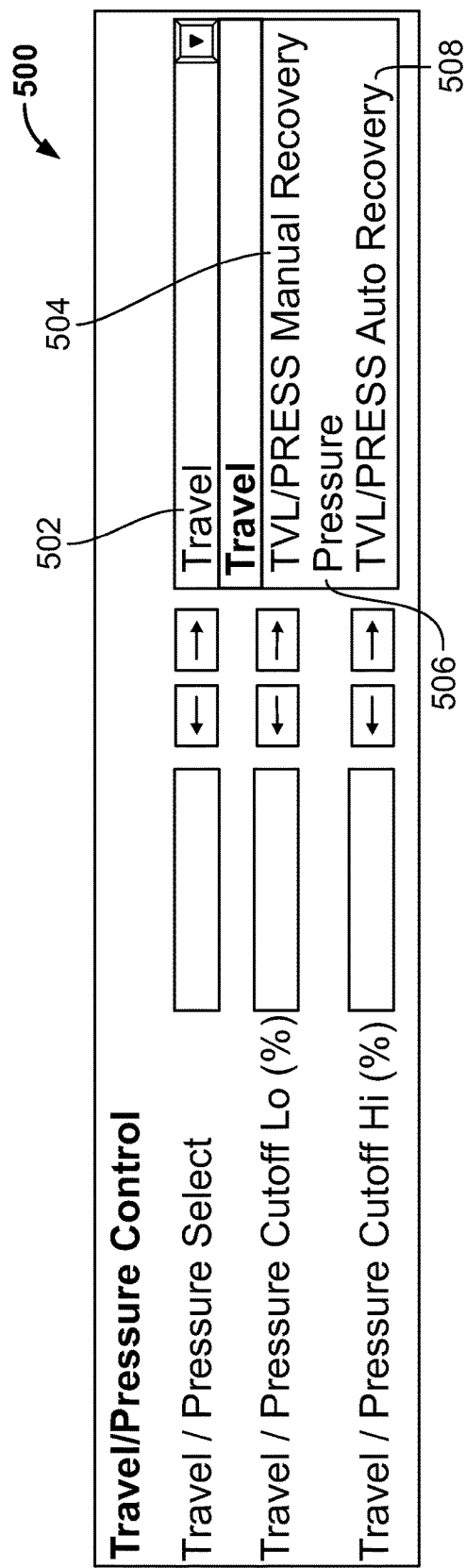
FIGS. 5 and 6 depict example screenshots of processes and/or operations that may be used to implement the examples disclosed herein.

FIG. 5 depicts an example screenshot 500 of a process and/or operation that may be used to implement the examples disclosed herein. Travel 502 may be associated with forced travel control and TVL/PRESS manual recovery 504 may be associated with pressure fallback if the travel sensor fails. In some examples, if a travel sensor failure alarm occurs, to switch back to travel control (e.g., travel 502), the travel sensor failure alarm is cleared and the power of the system is cycled. Pressure 506 is associated with forced pressure control and TVL/PRESS auto recovery 508 is associated with pressure fallback if the travel sensor fails. In some examples, if a travel sensor failure alarm occurs and is thereafter cleared, the system automatically transitions back to travel control (e.g., travel 502). While FIG. 5 is shown for pressure fallback in the event of a travel sensor failure, a similar user interface may be used for configuring minor loop feedback fallback.

Figure 6:
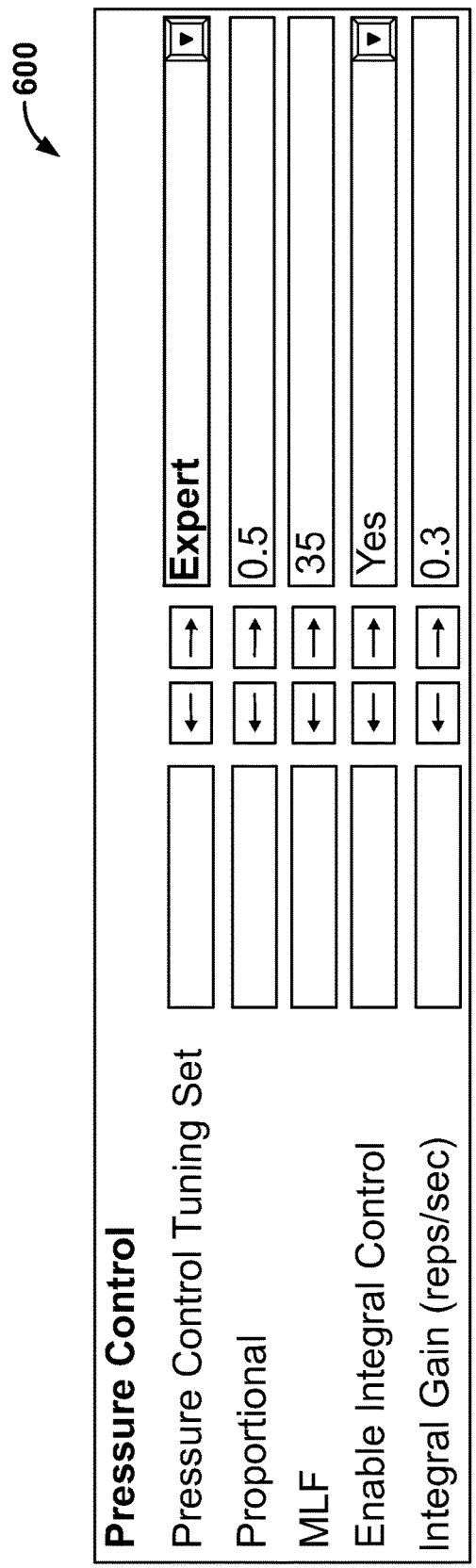

FIG. 6 depicts an example screenshot 600 of a process and/or operation that may be used to implement the examples disclosed herein and, specifically, to control pressure tuning. In some examples, pressure tuning set letters C-M are to match tuning set letters travel H and pressure H. In some examples, tuning set B is for bellows or configurations with restrictive accessories downstream of a positioner such as needle valves (e.g., type 111 needle valve of Emerson Process Management) and/or their equivalents. In some examples, integral control is required for pressure control. However, in other examples, integral control may not be required for pressure control. In some examples, Kdp/dt is included as a tuning parameter. In some examples, expert mode is used when there are accessories downstream of a positioner because a response of the system is tuned around a volume of tubing to the accessories and not the volume of the actuator.

Figure 7:
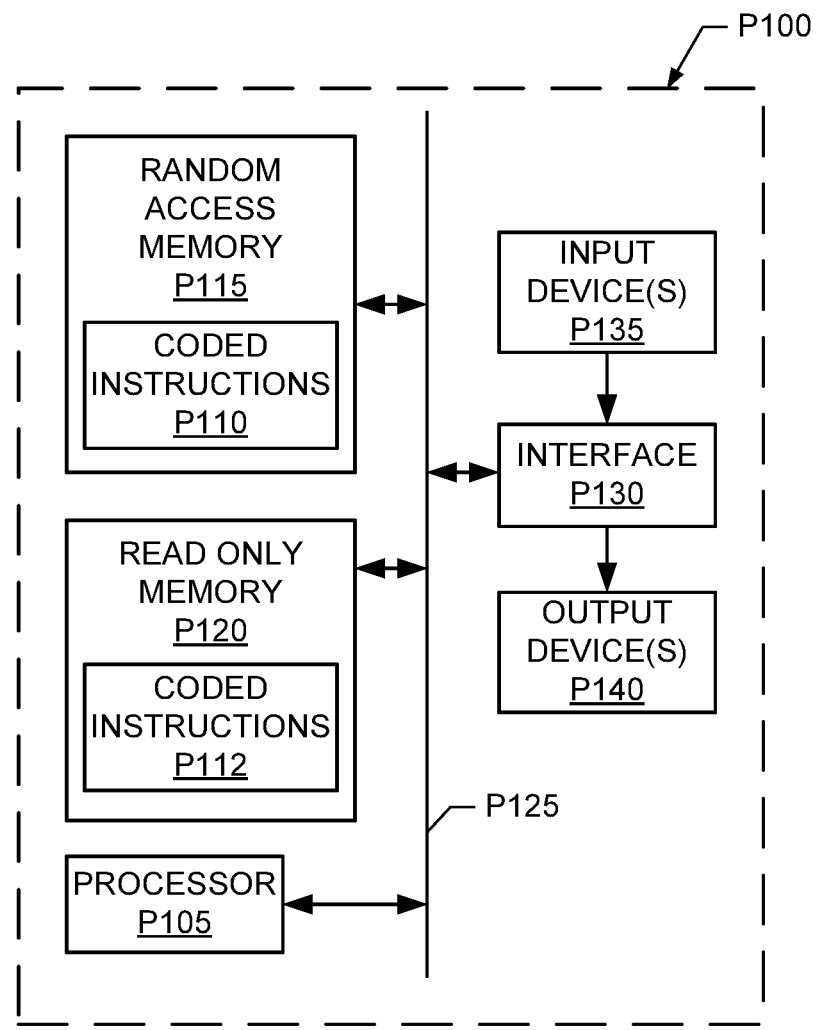
FIG. 7 is a schematic illustration of an example processor platform that may be used and/or programmed to implement any or all of the example systems and methods described herein.

FIG. 7 is a schematic diagram of an example processor platform P100 that may be used and/or programmed to implement to implement the examples disclosed herein. For example, the processor platform P100 can be implemented by one or more general purpose processors, processor cores, microcontrollers, etc.

The processor platform P100 of the example of FIG. 7 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

As set forth herein, an example method includes determining a first minor loop feedback value using a first control mode and controlling a process control device at least partially based on the first minor loop feedback value. In some examples, the method includes identifying the first minor loop feedback value being outside of a predetermined range or a failure of the first control mode, determining a second minor loop feedback value using a second control mode and controlling the process control device at least partially based on the second minor loop feedback value.

In some examples, the first control mode includes determining a position of a relay upstream of the process control device. In some examples, the second control mode includes determining an output pressure of a relay upstream of the process control device. In some examples, the second control mode also includes determining a derivative of the output pressure to determine the second minor loop feedback value. In some examples, the method also includes identifying a failure of the second control mode and controlling the process control device at least partially based on a third minor loop feedback value and a reduced forward path value. The third minor loop feedback value is approximately zero.

In some examples, the reduced forward path value includes a fixed upper limit or a fixed lower limit. In some examples, the reduced forward path value is approximately one third of a normal operation path value. In some examples, the method includes providing an alert when the first minor loop feedback value is identified as being outside of the predetermined range or the failure of the first control mode is identified. In some examples, the method also includes reducing a forward path value when the first minor loop feedback value is identified as being outside of the predetermined range or the failure of the first control mode is identified.

An example apparatus includes a first sensor to identify a first value used to determine a first minor loop feedback value. The first value is based on a relay position of a relay upstream of a process control device. The apparatus includes a second sensor to identify a second value used to determine a second minor loop feedback value. The second value is based on an output pressure of the relay. The apparatus includes a controller to use the second minor loop feedback value to at least partially control the process control device based on the first minor loop feedback value being outside of a predetermined range. In some examples, the second sensor includes a pressure sensor. In some examples, the second sensor includes a fallback control sensor. In some examples, the first sensor includes a minor loop feedback sensor. In some examples, the controller is to reduce a forward path value when the first minor loop feedback value is identified as being outside of a predetermined range.

Another example apparatus includes a minor loop feedback having a first mode and a second mode. The first mode is to output a first value used to control a process control device in a normal operation. The second mode is to output a second value used to control the process control device during a failure condition. The apparatus includes a controller to transition between the first mode and the second mode based on an identification of the failure condition.

In some examples, the first mode is to determine a first minor loop feedback value based on a position of a relay upstream of the process control device. In some examples, the second mode is to determine a second minor loop feedback value based on an output pressure of a relay upstream of the process control device. In some examples, the controller is to provide an alert when the failure condition is identified. In some examples, the controller is to reduce a forward path gain value when the failure condition is identified. In some examples, the reduced forward gain path value comprises a fixed upper limit or a fixed lower limit.

An example method includes determining a first minor loop feedback value using a first control mode; controlling a process control device at least partially based on the first minor loop feedback value; identifying the first minor loop feedback value being outside of a predetermined range or a failure of the first control mode; determining a second minor loop feedback value using a second control mode; controlling the process control device at least partially based on the second minor loop feedback value; and identifying a failure of the second control mode and controlling the process control device at least partially based on a third minor loop feedback value and a reduced forward path value, the third minor loop feedback value is approximately zero, the reduced forward path value comprises a fixed upper limit or a fixed lower limit.

In some example, the first control mode comprises determining a position of a relay upstream of the process control device. In some examples, the second control mode comprises determining an output pressure of a relay upstream of the process control device. In some examples, the second control mode further comprises determining a derivative of the output pressure to determine the second minor loop feedback value. In some examples, the example method includes identifying a failure of the second control mode and controlling the process control device at least partially based on a third minor loop feedback value and a reduced forward path value, the third minor loop feedback value is approximately zero. In some example, the method includes providing an alert when the first minor loop feedback value is identified as being outside of the predetermined range or the failure of the first control mode is identified.

An example apparatus includes a first sensor to identify a first value used to determine a first minor loop feedback value, the first value based on a relay position of a relay upstream of a process control device; a second sensor to identify a second value used to determine a second minor loop feedback value, the second value based on an output pressure of the relay; and a controller to use the second minor loop feedback value to at least partially control the process control device based on the first minor loop feedback value being outside of a predetermined range, the controller is to reduce a forward path value when the first minor loop feedback value is identified as being outside of a predetermined range.

In some example, the second sensor includes a pressure sensor. In some example, the second sensor includes a fallback control sensor. In some example, the first sensor includes a minor loop feedback sensor.

An example apparatus includes a minor loop feedback having a first mode and a second mode, the first mode to output a first value used to control a process control device in a normal operation, the second mode to output a second value used to control the process control device during a failure condition; and a controller to transition between the first mode and the second mode based on an identification of the failure condition, wherein the controller is to reduce a forward path gain value when the failure condition is identified.

In some examples, the first mode is to determine a first minor loop feedback value based on a position of a relay upstream of the process control device. In some examples, the second mode is to determine a second minor loop feedback value based on an output pressure of a relay upstream of the process control device. In some examples, the controller is to provide an alert when the failure condition is identified. In some examples, the reduced forward gain path value comprises a fixed upper limit or a fixed lower limit.

An example method includes determining a first minor loop feedback value using a first control mode; controlling a process control device at least partially based on the first minor loop feedback value; identifying the first minor loop feedback value being outside of a predetermined range or a failure of the first control mode; determining a second minor loop feedback value using a second control mode; controlling the process control device at least partially based on the second minor loop feedback value; and identifying a failure of the second control mode and controlling the process control device at least partially based on a third minor loop feedback value and a reduced forward path value, the third minor loop feedback value is approximately zero, wherein the reduced forward path value is approximately one third of a normal operation path value.

In some examples, the first control mode includes determining a position of a relay upstream of the process control device. In some examples, the second control mode includes determining an output pressure of a relay upstream of the process control device. In some examples, the second control mode further includes determining a derivative of the output pressure to determine the second minor loop feedback value. In some examples, the method includes providing an alert when the first minor loop feedback value is identified as being outside of the predetermined range or the failure of the first control mode is identified.

An example method includes determining a first minor loop feedback value using a first control mode; controlling a process control device at least partially based on the first minor loop feedback value; identifying the first minor loop feedback value being outside of a predetermined range or a failure of the first control mode; determining a second minor loop feedback value using a second control mode; controlling the process control device at least partially based on the second minor loop feedback value; and reducing a forward path value when the first minor loop feedback value is identified as being outside of the predetermined range or the failure of the first control mode is identified.

In some examples, the first control mode comprises determining a position of a relay upstream of the process control device. In some examples, the second control mode comprises determining an output pressure of a relay upstream of the process control device. In some examples, the second control mode further comprises determining a derivative of the output pressure to determine the second minor loop feedback value. In some examples, the method includes providing an alert when the first minor loop feedback value is identified as being outside of the predetermined range or the failure of the first control mode is identified.

An example tangible machine-readable medium comprising instructions which, when executed, cause a processor to at least: determine a first minor loop feedback value based on a first control mode; control a process control device at least partially based on the first minor loop feedback value; identify the first minor loop feedback value being outside of a predetermined range or a failure of the first control mode; determine a second minor loop feedback value based on a second control mode; control the process control device at least partially based on the second minor loop feedback value; and identify a failure of the second control mode and control the process control device at least partially based on a third minor loop feedback value of approximately zero and a reduced forward path value, wherein the reduced forward path value comprises a fixed upper limit or a fixed lower limit.

In some examples, the instructions, when executed, further cause the processor to use the first control mode to determine a position of a relay upstream of the process control device. In some examples, the instructions, when executed, further cause the processor to use the second control mode to determine an output pressure of a relay upstream of the process control device. In some examples, the instructions, when executed, further cause the processor to determine a derivative of the output pressure to determine the second minor loop feedback value. In some examples, the instructions, when executed, further cause the processor to provide an alert when the first minor loop feedback value is identified as being outside of the predetermined range or the failure of the first control mode is identified.

An example tangible machine-readable medium comprising instructions which, when executed, cause a processor to at least: determine a first minor loop feedback value based on a first control mode; control a process control device at least partially based on the first minor loop feedback value; identify the first minor loop feedback value being outside of a predetermined range or a failure of the first control mode; determine a second minor loop feedback value based on a second control mode; control the process control device at least partially based on the second minor loop feedback value; and identify a failure of the second control mode and control the process control device at least partially based on a third minor loop feedback value of approximately zero and a reduced forward path value, wherein the reduced forward path value is approximately one third of a normal operation path value.

In some examples, the instructions, when executed, further cause the processor to use the first control mode to determine a position of a relay upstream of the process control device. In some examples, the instructions, when executed, further cause the processor to use the second control mode to determine an output pressure of a relay upstream of the process control device. In some examples, the instructions, when executed, further cause the processor to determine a derivative of the output pressure to determine the second minor loop feedback value. In some examples, the instructions, when executed, further cause the processor to provide an alert when the first minor loop feedback value is identified as being outside of the predetermined range or the failure of the first control mode is identified.

An example tangible machine-readable medium comprising instructions which, when executed, cause a processor to at least: determine a first minor loop feedback value based on a first control mode; control a process control device at least partially based on the first minor loop feedback value; identify the first minor loop feedback value being outside of a predetermined range or a failure of the first control mode; determine a second minor loop feedback value based on a second control mode; control the process control device at least partially based on the second minor loop feedback value; and reduce a forward path value when the first minor loop feedback value is identified as being outside of the predetermined range or the failure of the first control mode is identified.

In some examples, the instructions, when executed, further cause the processor to identify a failure of the second control mode and control the process control device at least partially based on a third minor loop feedback value and a reduced forward path value, wherein the third minor loop feedback value is approximately zero. In some examples, the instructions, when executed, further cause the processor to use the first control mode to determine a position of a relay upstream of the process control device. In some examples, the instructions, when executed, further cause the processor to use the second control mode to determine an output pressure of a relay upstream of the process control device. In some examples, the instructions, when executed, further cause the processor to determine a derivative of the output pressure to determine the second minor loop feedback value. In some examples, the instructions, when executed, further cause the processor to provide an alert when the first minor loop feedback value is identified as being outside of the predetermined range or the failure of the first control mode is identified.

An example apparatus includes a housing; and a processor disposed in the housing, the processor to: determine a first minor loop feedback value based on a first control mode; control a process control device at least partially based on the first minor loop feedback value; identify the first minor loop feedback value being outside of a predetermined range or a failure of the first control mode; determine a second minor loop feedback value based on a second control mode; control the process control device at least partially based on the second minor loop feedback value; and identify a failure of the second control mode and control the process control device at least partially based on a third minor loop feedback value of approximately zero and a reduced forward path value, wherein the reduced forward path value comprises a fixed upper limit or a fixed lower limit.

In some examples, the processor is to use the first control mode to determine a position of a relay upstream of the process control device. In some examples, the processor is to use the second control mode to determine an output pressure of a relay upstream of the process control device. In some examples, the processor is to determine a derivative of the output pressure to determine the second minor loop feedback value. In some examples, the processor is to provide an alert when the first minor loop feedback value is identified as being outside of the predetermined range or the failure of the first control mode is identified.

An example apparatus includes a housing; and a processor disposed in the housing, the processor to: determine a first minor loop feedback value based on a first control mode; control a process control device at least partially based on the first minor loop feedback value; identify the first minor loop feedback value being outside of a predetermined range or a failure of the first control mode; determine a second minor loop feedback value based on a second control mode; control the process control device at least partially based on the second minor loop feedback value; and identify a failure of the second control mode and control the process control device at least partially based on a third minor loop feedback value and a reduced forward path value, the third minor loop feedback value is approximately zero, wherein the reduced forward path value is approximately one third of a normal operation path value.

In some examples, the processor is to use the first control mode to determine a position of a relay upstream of the process control device. In some examples, the processor is to use the second control mode to determine an output pressure of a relay upstream of the process control device. In some examples, the processor is to determine a derivative of the output pressure to determine the second minor loop feedback value. In some examples, the processor is to provide an alert when the first minor loop feedback value is identified as being outside of the predetermined range or the failure of the first control mode is identified.

An example apparatus includes housing; and a processor disposed in the housing, the processor to: determine a first minor loop feedback value based on a first control mode; control a process control device at least partially based on the first minor loop feedback value; identify the first minor loop feedback value being outside of a predetermined range or a failure of the first control mode; determine a second minor loop feedback value based on a second control mode; control the process control device at least partially based on the second minor loop feedback value; and reduce a forward path value when the first minor loop feedback value is identified as being outside of the predetermined range or the failure of the first control mode is identified.

In some examples, the processor is to identify a failure of the second control mode and control the process control device at least partially based on a third minor loop feedback value and a reduced forward path value, wherein the third minor loop feedback value is approximately zero. In some examples, the processor is to use the first control mode to determine a position of a relay upstream of the process control device. In some examples, the processor is to use the first control mode to determine a position of a relay upstream of the process control device. In some examples, the processor is to use the second control mode to determine an output pressure of a relay upstream of the process control device. In some examples, the processor is to determine a derivative of the output pressure to determine the second minor loop feedback value. In some examples, the processor is to provide an alert when the first minor loop feedback value is identified as being outside of the predetermined range or the failure of the first control mode is identified.

An example method includes controlling a process control device using first values from a first sensor; comparing the first values to reference values to identify a difference; and in response to the difference being outside of a threshold, controlling the process control device using second values from a second sensor. In some examples, the first sensor includes a minor loop feedback sensor and the second sensor includes a pressure fallback sensor. In some examples, the first values are used during a normal operation mode and the second values are used during a failure operation mode.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A non-transitory machine-readable medium comprising instructions which, when executed, cause a processor to at least:
   determine a first minor loop feedback value based on a first control mode associated with a first minor loop feedback control path and a first sensor;
   control a process control device at least partially based on the first minor loop feedback value;

identify (a) the first minor loop feedback value as outside a predetermined range of the first control mode or (b) a failure of the first control mode; and in response to identifying that the first minor loop feedback value is outside of the predetermined range or the failure of the first control mode:

determine a second minor loop feedback value based on a second control mode associated with a second minor loop feedback control path and a second sensor; and control the process control device at least partially based on the second minor loop feedback value, each of the first minor loop feedback value and the second minor loop feedback value to be determined upstream of an actuator of the process control device.

2. The machine-readable medium of claim 1, wherein the instructions, when executed, further cause the processor to determine a position of a relay upstream of the process control device.

3. The machine-readable medium of claim 1, wherein the instructions, when executed, further cause the processor to determine an output pressure of a relay upstream of the process control device.

4. The machine-readable medium of claim 3, wherein the instructions, when executed, further cause the processor to determine a derivative of the output pressure to determine the second minor loop feedback value.

5. The machine-readable medium of claim 1, wherein the instructions, when executed, further cause the processor to identify a failure of the second control mode and control the process control device at least partially based on a third minor loop feedback value of approximately zero and a reduced forward path value.

6. The machine-readable medium of claim 5, wherein the reduced forward path value comprises a fixed upper limit or a fixed lower limit.

7. The machine-readable medium of claim 5, wherein the reduced forward path value is approximately one third of a normal operation path value.

8. The machine-readable medium of claim 1, wherein the instructions, when executed, further cause the processor to reduce a forward path value when the first minor loop feedback value is identified as being outside of the predetermined range or the failure of the first control mode is identified.

9. The machine-readable medium of claim 2, wherein the instructions, when executed, cause the processor to determine the first minor loop feedback value based on the position of the relay.

10. The machine-readable medium of claim 3, wherein the instructions, when executed, cause the processor to determine the first minor loop feedback value based on a derivative of the output pressure.

11. The machine-readable medium of claim 1, wherein the first sensor is a minor loop feedback sensor and the second sensor is a pressure sensor.

12. The machine-readable medium of claim 11, wherein the failure of the first control mode includes a failure of the minor loop feedback sensor.

13. The machine-readable medium of claim 11, wherein the failure of the first control mode includes the first minor loop feedback value being constant.

14. The machine-readable medium of claim 1, wherein, in response to identifying that the first minor loop feedback value is outside of the predetermined range or the failure of the first control mode, the instructions, when executed, cause a switch to move between the first control mode and the second control mode.

15. A non-transitory machine-readable medium comprising instructions which, when executed, cause a processor to at least:

determine a first minor loop feedback value based on a first sensor and a first control mode;

control a process control device at least partially based on the first minor loop feedback value;

identify (a) the first minor loop feedback value as outside a predetermined range of the first control mode or (b) a failure of the first control mode; and in response to identifying that the first minor loop feedback value is outside of the predetermined range or the failure of the first control mode:

cause an alert to be output;

determine a second minor loop feedback value based on a second sensor and a second control mode; and switch from controlling the process control device at least partially based on the first minor loop feedback value to controlling the process control device at least partially based on the second minor loop feedback value, each of the first minor loop feedback value and the second minor loop feedback value to be determined upstream of an actuator of the process control device.

16. An apparatus, comprising:

a housing; and a processor disposed in the housing, the processor to:

determine a first minor loop feedback value based on a first control mode associated with a first minor loop feedback control path and a first sensor;

control a process control device at least partially based on the first minor loop feedback value;

identify (a) the first minor loop feedback value as outside a predetermined range or (b) a failure of the first control mode; and in response to identifying that the first minor loop feedback value is outside of the predetermined range or the failure of the first control mode:

cause an alert to be output;

determine a second minor loop feedback value based on a second control mode associated with a second minor loop feedback control path and a second sensor; and control the process control device at least partially based on the second minor loop feedback value, the first minor loop feedback control path upstream of the process control device and the second minor loop feedback control path upstream of an actuator of the process control device.

17. The apparatus of claim 16, wherein the processor is to determine a position of a relay upstream of the process control device.

18. The apparatus of claim 16, wherein the processor is to determine an output pressure of a relay upstream of the process control device.

19. The apparatus of claim 18, wherein the processor is to determine a derivative of the output pressure to determine the second minor loop feedback value.

20. The apparatus of claim 16, wherein the processor is to identify a failure of the second control mode and control the process control device at least partially based on a third minor loop feedback value of approximately zero and a reduced forward path value.

21. The apparatus of claim 20, wherein the reduced forward path value comprises a fixed upper limit or a fixed lower limit.

22. The apparatus of claim 20, wherein the reduced forward path value is approximately one third of a normal operation path value.

23. The apparatus of claim 16, wherein the processor is to reduce a forward path value when the first minor loop feedback value is identified as being outside of the predetermined range or the failure of the first control mode is identified.

24. A method, comprising:
controlling a process control device using first values from a first sensor associated with a first minor loop feedback control path, the first values determined upstream of an actuator of the process control device;
comparing the first values to reference values to identify a difference;
identifying the difference as being outside of a threshold; and
in response to identifying that the difference is outside of the threshold, switching from controlling the process control device using the first values from the first sensor to controlling the process control device using second values from a second sensor associated with a second minor loop feedback control path, the second values determined upstream of the actuator of the process control device.

25. The method of claim 24, wherein the first sensor includes a minor loop feedback sensor and the second sensor includes a pressure fallback sensor.

26. The method of claim 24, wherein the first values are used during a normal operation mode and the second values are used during a failure operation mode.

* * * * *